US008548766B2

(12) United States Patent
Judd

(10) Patent No.: US 8,548,766 B2
(45) Date of Patent: Oct. 1, 2013

(54) SYSTEMS AND METHODS FOR GYROSCOPE CALIBRATION

(75) Inventor: Tom Judd, Carlsbad, CA (US)

(73) Assignee: Honeywell International Inc., Morristown, NJ (US)

( * ) Notice: Subject to any disclaimer, the term of this patent is extended or adjusted under 35 U.S.C. 154(b) by 1042 days.

(21) Appl. No.: 12/558,871

(22) Filed: Sep. 14, 2009

(65) Prior Publication Data
US 2011/0066395 A1    Mar. 17, 2011

(51) Int. Cl.
G01C 19/00    (2013.01)
G06F 19/00    (2011.01)

(52) U.S. Cl.
USPC ................ 702/104; 702/92; 702/93

(58) Field of Classification Search
USPC ............. 702/85, 92, 94, 104, 141, 145, 150, 702/153, 155, 93
See application file for complete search history.

(56) References Cited

U.S. PATENT DOCUMENTS

| 4,347,730 | A | | 9/1982 | Fisher et al. |
| 4,472,884 | A | * | 9/1984 | Engebretson ............ 33/304 |
| 4,539,760 | A | | 9/1985 | Marchent et al. |
| 4,698,912 | A | | 10/1987 | Fowler et al. |
| 5,345,382 | A | | 9/1994 | Kao |
| 5,374,933 | A | | 12/1994 | Kao |
| 5,440,484 | A | | 8/1995 | Kao |
| 6,009,629 | A | | 1/2000 | Gnepf et al. |
| 6,408,251 | B1 | | 6/2002 | Azuma |
| 6,421,622 | B1 | * | 7/2002 | Horton et al. ............ 702/95 |
| 6,577,976 | B1 | | 6/2003 | Hoff et al. |
| 6,647,352 | B1 | * | 11/2003 | Horton ................ 702/151 |
| 6,853,947 | B1 | * | 2/2005 | Horton ................ 702/151 |
| 6,918,186 | B2 | | 7/2005 | Ash et al. |
| 7,275,008 | B2 | | 9/2007 | Plyvanainen |
| 7,418,364 | B1 | * | 8/2008 | Horton et al. ............ 702/153 |
| 2004/0186676 | A1 | | 9/2004 | Liu et al. |
| 2005/0099177 | A1 | | 5/2005 | Greelish |
| 2005/0227775 | A1 | | 10/2005 | Cassady et al. |
| 2005/0240347 | A1 | * | 10/2005 | Yang ................ 701/220 |
| 2007/0055468 | A1 | | 3/2007 | Pylvanainen |
| 2008/0046214 | A1 | * | 2/2008 | Fowler ................ 702/150 |
| 2009/0326851 | A1 | * | 12/2009 | Tanenhaus ................ 702/96 |

FOREIGN PATENT DOCUMENTS

| EP | 1310770 | 5/2003 |
| WO | 0237827 | 5/2002 |
| WO | 2006113391 | 10/2006 |

OTHER PUBLICATIONS

European Patent Office, "European Search Report", Nov. 26, 2010, Published in: EP.
Judd, "U.S. Appl. No. 12/558,889: Systems and Methods for Calibration of Gyroscopes and a Magnetic Compass", Sep. 14, 2009.
"Handbook of Magnetic Compass Adjustment", 2004, Publisher: National Geospatial-Intelligence Agency , Published in: Bethesda, MD.

* cited by examiner

Primary Examiner — Alexander H Taningco
Assistant Examiner — Yaritza H Perez Bermudez
(74) Attorney, Agent, or Firm — Fogg & Powers LLC

(57) ABSTRACT

A method that compensates gyroscopes comprises rotating a sensor platform with three gyroscopes, three accelerometers and three magnetometers thereon; determining a first rotation vector Og based upon the rotation sensed by at least one of the three gyroscopes; determining a second rotation vector Om vector based upon the rotation sensed by the three accelerometers and the three magnetometers; and determining a compensation gain and a compensation bias for the at least one gyroscope based upon the first rotation vector and the second rotation vector.

16 Claims, 3 Drawing Sheets

SYSTEMS AND METHODS FOR GYROSCOPE CALIBRATION

BACKGROUND OF THE INVENTION

Micro-Electro-Mechanical Systems (MEMS) rate gyroscope (gyros) may be susceptible to a bias error. In the absence of a bias error, the output of a stationary (not rotating) gyroscope should be zero. However, a bias error will cause some amount of output signal from the stationary gyroscope. If uncompensated, such bias errors can lead to large drift errors when used in a navigation device. Typically, the gyroscope is calibrated at the factory before installation in the field. A traditional method to reduce gyroscope bias is to perform a calibration while the gyroscope is stationary.

However, bias errors may not remain constant over time. Accordingly, bias compensation for the gyroscope determined during a factory calibration process may not permanently correct the gyroscope bias. Thus, there may be a need to periodically recalibrate the gyroscope in the field in order to maintain accuracy.

Additionally, the gyroscope may be subject to gain errors. A gain error relates to the accuracy of an amount of degrees of rotation sensed by the gyroscope. For example, if a gyroscope is rotated by 360°, then its output should correspond to 360° of rotation. If the gyroscope has a gain error, the gyroscope output would not correspond to the actual amount of rotation. For example, if the gyroscope has a +10% gain error, the output of the gyroscope would correspond to 396° for an actual rotation of 360°. In this example, gain error compensation is required for an accurate gyroscope output.

Typically, the gyroscope is calibrated at the factory before installation in the field to compensate for gain error. However, there may be a need to periodically recalibrate the gyroscope in the field to compensate for gain error in order to maintain accuracy.

SUMMARY OF THE INVENTION

Systems and methods may be used to determine gain compensation and/or bias compensation for gyroscopes in the field where access to specialized calibration tools is limited. An exemplary embodiment rotates a sensor platform with at least one gyroscope thereon, and with at least one of an accelerometer and a magnetometer thereon, determines a measured rotation based upon the rotation sensed by the at least one gyroscope, derives a rotation based upon the changes in the earth's gravitational field sensed by the at least one accelerometer, derives a rotation based on the changes in the earth's magnetic field sensed by at least one magnetometer, and determines at least one of a compensation gain and a compensation bias for the at least one gyroscope based upon the determined observed rotation and the derived rotation.

In accordance with further aspects, an exemplary embodiment has at least one gyroscope mounted on a sensor platform and configured to sense a rotation of the sensor platform, at least one accelerometer mounted on the sensor platform and configured to sense changes in the earth's gravitational field due to rotation, and at least one magnetometer mounted on the sensor platform and configured to sense changes in the earth's magnetic field due to the rotation of the sensor platform, and a processor system operable to receive information corresponding to the sensed rotation from the at least one gyroscope and the at least one accelerometer and magnetometer. The processor system determines a measured rotation based upon the rotation sensed by the at least one gyroscope, derives a rotation based upon the changes sensed by the at least one accelerometer and magnetometer, and determines at least one of a compensation gain and a compensation bias for the at least one gyroscope based upon a comparison of the determined observed rotation vector from the at least one gyroscope with the derived rotation vectors from the at least one accelerometer and the at least one magnetometer.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
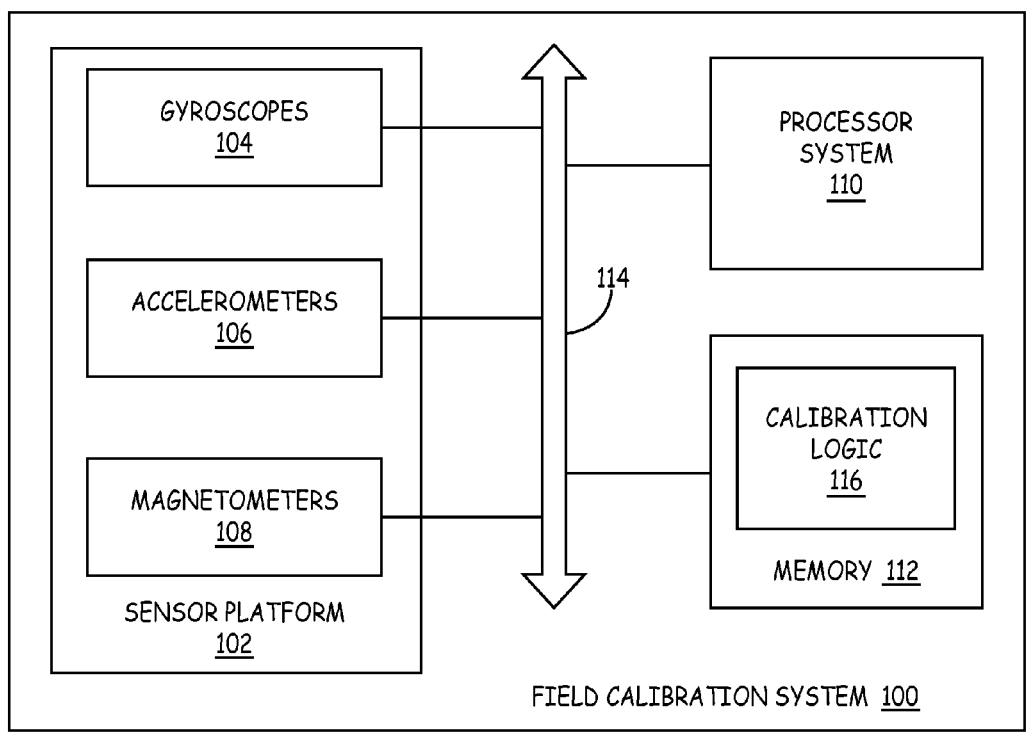
FIG. 1 is a block diagram of an embodiment of the field calibration system.

FIG. 1 is a block diagram of an embodiment of a field calibration system 100. An exemplary embodiment of the field calibration system 100 includes a sensor platform 102 with a plurality of gyroscopes 104, a plurality of accelerometers 106, and a plurality of magnetometers 108 thereon. During calibration, the sensor platform 102 is rotated in three dimensional space, referred to herein interchangeably as a calibration rotation. The field calibration system 100 senses the rotation of the sensor platform 102, and based upon the rotation sensed by the gyroscopes 104, the accelerometers 106, and the magnetometers 108, determines bias compensation and gain compensation for one or more of the gyroscopes 104.

In an exemplary embodiment, the field calibration system 100 determines rotation of at least two independent rotation vectors based upon changes sensed by the accelerometers 106 and/or magnetometers 108. The determined independent rotation vectors are used to determine a measured rotation vector Om. During the calibration rotation, the output from the gyroscopes is used to determine a corresponding observed rotation vector Og. Comparison of the determined measured rotation vector Om with the observed gyroscope rotation vector Og allows determination of the bias compensation and/or the gain compensation for the gyroscopes. When a plurality of gyroscopes 104 are mounted on the sensor platform 102, bias compensation and/or the gain compensation may be determined for all of the gyroscopes 104 at the same time, or the compensation for individual gyroscopes may be determined separately based upon a plurality of calibration rotations.

The exemplary field calibration system 100 further includes a processor system 110 and a memory 112. The gyroscopes 104, the accelerometers 106, the magnetometers 108, the processor system 110, and the memory 112 are communicatively coupled to a communication bus 114, thereby providing connectivity to the above-described components. In alternative embodiments of the field calibration system 100, the above-described components may be communicatively coupled to each other in a different manner. For example, one or more of the above-described components may be directly coupled to the processor system 110, or may be coupled to the processor system 110 via intermediary components (not shown).

The memory 112 includes a region where the calibration logic 116 is stored. The processor 110 retrieves and executes the calibration logic 116 to determine the bias compensation and/or the gain compensation for one or more of the gyroscopes 104.

Figure 2:
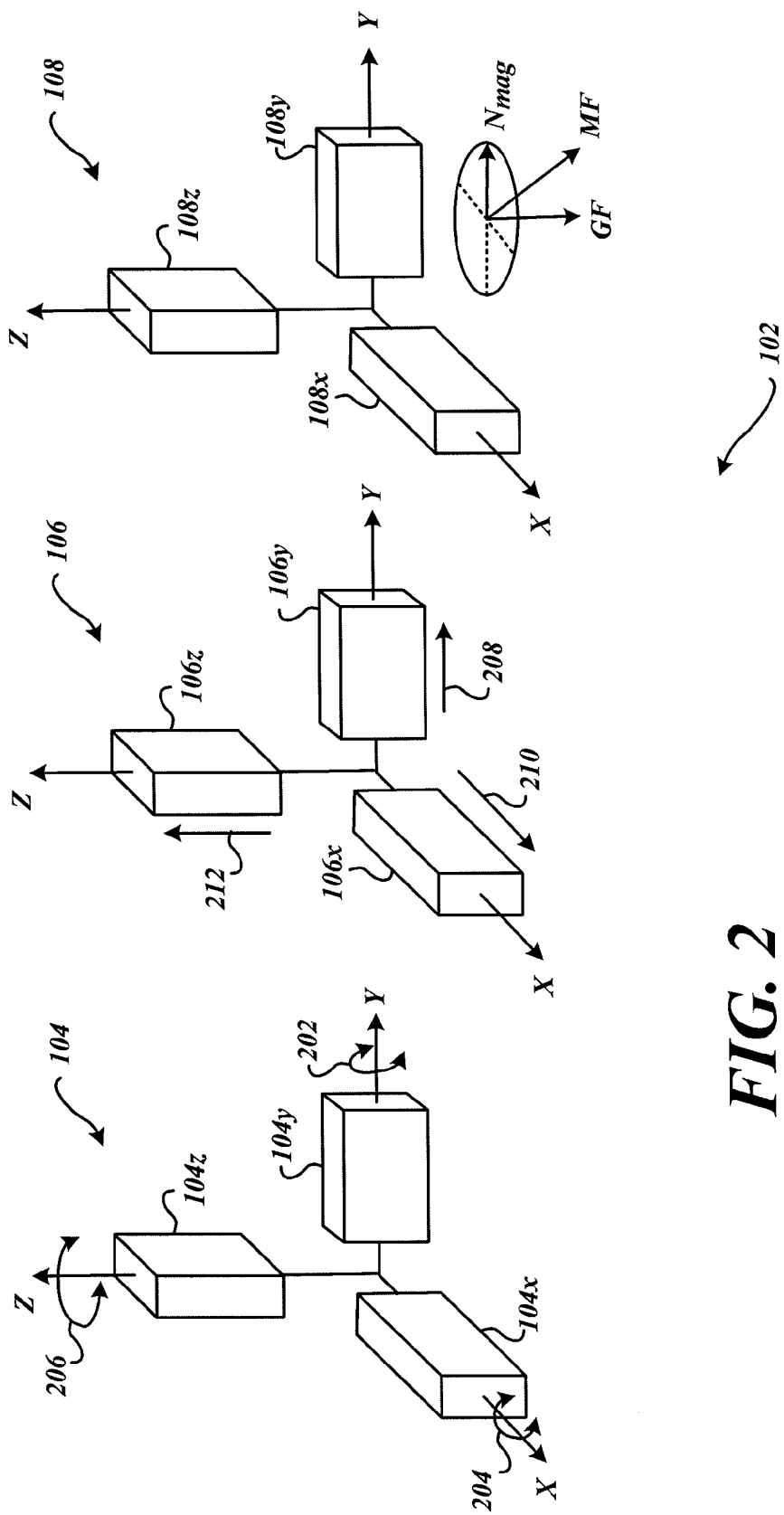
FIG. 2 is a conceptual perspective view of the gyroscopes, the accelerometers, and the magnetometers in an exemplary embodiment of the field calibration system.

FIG. 2 is a conceptual perspective view of the gyroscopes 104, the accelerometers 106, and the magnetometers 108 in an exemplary embodiment of the field calibration system 100. In this embodiment, three gyroscopes 104x, 104y, and 104z are orthogonally mounted on the sensor platform 102. Additionally, three accelerometers 106x, 106y, and 106z, and three magnetometers 108x, 108y, and 108z, are orthogonally mounted on the sensor platform 102. Other embodiments include less than, or more than, the illustrated three gyroscopes 104, the illustrated three accelerometers 106, and/or the illustrated three magnetometers 108. Further, in alternative embodiments, the gyroscopes 104, the accelerometers 106, and/or the magnetometers 108 are mounted on the sensor platform 102 in other independent orientations.

The exemplary gyroscopes 104x, 104y, and 104z, are operable to sense rotation about the x-axis, the y-axis, and the z-axis, respectively (as denoted by the illustrated direction arrows 202, 204, and 206, respectively). The exemplary accelerometers 106x, 106y, and 106z, sense a linear acceleration along the x-axis, the y-axis, and the z-axis, respectively (as denoted by the illustrated direction arrows 208, 210, and 212, respectively). The exemplary magnetometers 108x, 108y, and 108z, sense orientation of the earth's magnetic field (as denoted by the illustrated direction arrow MF). A gravity vector (GV) and a magnetic north vector (Nmag) may be determined from the accelerometers 106x, 106y, and 106z and from the magnetometers 108x, 108y, and 108z.

It is appreciated that when in a laboratory or factory environment, bias and/or gain calibration of the gyroscopes 104, may be performed in a precisely controlled manner. For example, the z-axis gyroscope 104z may be calibrated by rotations about the z-axis when the sensor platform 102 is mounted on a calibration table. The calibration rotations may be sensed by changes in the x-axis magnetometer 108x and the y-axis magnetometer 108y. The calibration rotations about the z-axis would be accurately sensed by the x-axis magnetometer 108x and/or the y-axis magnetometer 108y since the rotation of the sensor platform 102 could be precisely maintained within the x-y plane in the laboratory or factory environment.

During a single dimensional calibration rotation about a gyroscope axis, the rotated gyroscope senses the rotation about its axis. The gyroscope output corresponds to a measured rotation Om (also interchangeably referred to as the measured rotation vector Om). Since the amount of the calibration rotation is known, the observed gyroscope rotation Og (also interchangeably referred to as the observed gyroscope rotation vector Og) may be determined. The measured rotation Om is compared to the observed gyroscope rotation Og, where Om=a*(Og−b). Here, a is the gain and b is the bias for the gyroscope that sensed the measured rotation Om. The gain a and the bias b may be determined from Om and Og.

When in the field, it is very difficult to maintain the sensor platform 102 within the x-y plane during a calibration rotation. Accordingly, a field calibration rotation in three-dimensional (3-D) space must be considered. Thus, the above-described situation for rotation about a single axis becomes more complex when calibration rotation in an out of plane axis is considered. During the out of plane calibration rotation, the sensor platform 102 is rotated about an axis that is not aligned with the x-axis, the y-axis, and/or the z-axis.

The measured rotation vector Om may be determined from the out of plane calibration rotation sensed by the rotated gyroscope. Also, based on the rotation, the observed gyroscope rotation vector Og may be estimated from other sensors (the accelerometers 106 and the magnetometers 108). To address ambiguities that may arise during solution of the equations below, the affect of the rotation on two constant independent vectors M and A is observed. One of the constant vectors is the earth's magnetic field, and the other is the gravitation vector. If one of the two independent vectors M and A cannot be used for a particular observed gyroscope rotation vector Og, the other independent vector may be used. For example, if M were nearly collinear with the axis of the rotation Og, then the change M from the rotation would barely be detectable. The gravity vector and the magnetic field are not collinear. So, if one of them lies along the axis of rotation, the other will not, and can be used to measure the change in Og.

The observed gyroscope rotation vector Og may be determined from the vector M, the vector A, the derivative of the vector M (dM), and the derivative of the vector A (dA). The observed gyroscope rotation vector Og may then be used to solve for the bias compensation and/or the gain compensation. Preferably, the out of plane calibration rotation is a relatively slow motion, where the sensed linear acceleration is small relative to the rotation.

The accelerometers 106 and the magnetometers 108 are affected by rotation of the sensor platform 102 in a predictable way. The magnitude of the two vectors should not change, since the gravitational and magnetic fields are locally constant. But, the direction will, provided the rotation is about an axis that is not collinear with the magnetometer and/or accelerometer vector. Based upon the rotation, the two independent rotation measurements are determined from the changes in direction sensed by the accelerometers 106 and/or by direction changes sensed by the magnetometers 108.

Figure 3:
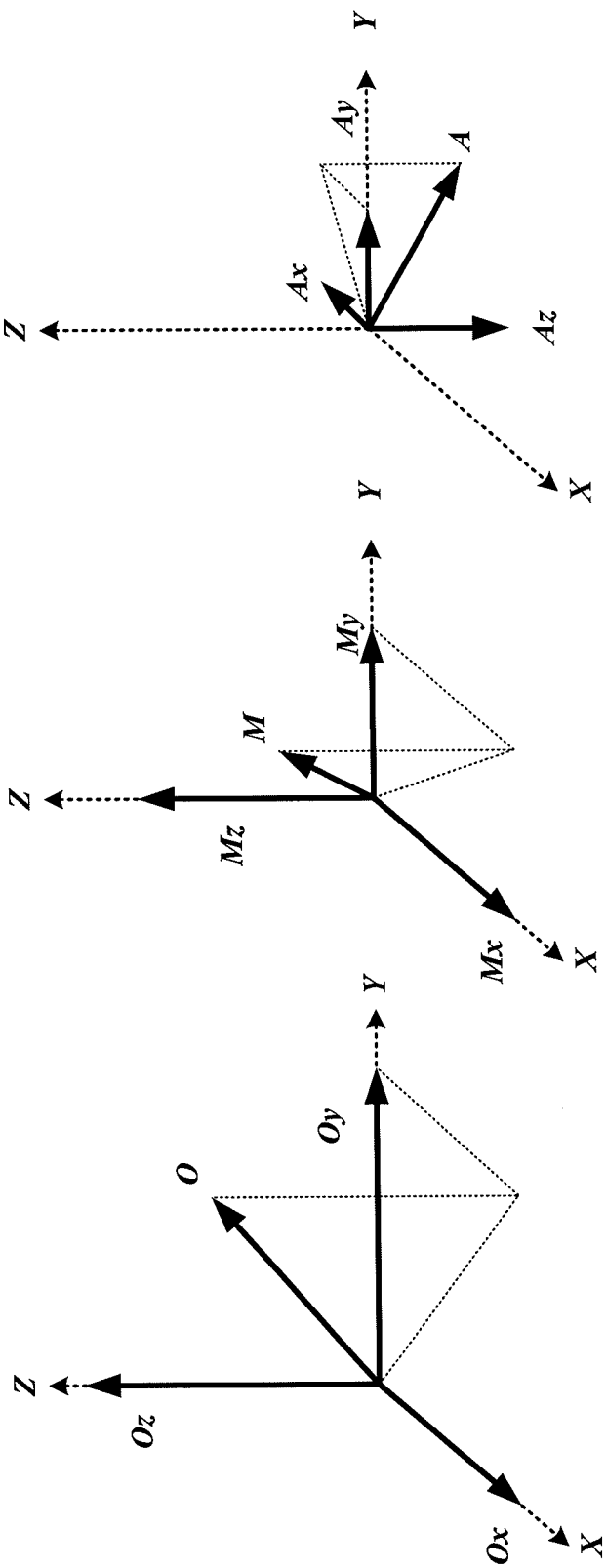
FIG. 3 is a conceptual perspective view of a gyroscope rotation vector and two independent rotation vectors.

FIG. 3 is a conceptual perspective view of an observed gyroscope rotation vector Og and two independent vectors M (associated with the magnetometers 108) and A (associated with the accelerometers 106). The observed gyroscope rotation vector Og includes an x-axis component Ox, a y-axis component Oy, and a z-axis component Oz. The first independent vector M includes an x-axis component Mx, a y-axis component My, and a z-axis component Mz. The second independent vector A includes an x-axis component Ax, a y-axis component Ay, and a z-axis component Az. In alternative embodiments, the vectors Og, M, and A may be defined using another suitable coordinate reference system.

From an ensemble of measurements obtained from the accelerometers 106 and/or the magnetometers 108, linear regression may be used to determine the gain a and the bias b for one or more of the gyroscopes 104 in a least squares sense. A correlation function may be used to judge the goodness of the fit between the measured independent vectors (A and/or M) and the observed gyroscope rotation vector Og.

Accordingly, the two independent vectors A or M are selected so as to point in different directions by setting a maximum threshold on the dot product of unit vectors in the corresponding directions. The two independent vectors A or M can be obtained simultaneously from the accelerometers 106 and/or the magnetometers 108.

Embodiments of the field calibration system 100 obtain an estimate of the rotation from observations of the independent vectors A or M. The field calibration system 100 calculates changes dM and dA from a history of observations of the two independent vectors A or M. For a small rotation of the sensor platform 102, the following equations (1) and (2) are applicable:

$$dM = Om \times M \qquad \text{Eq. (1)}$$

$$dA = Om \times A \qquad \text{Eq. (2)}$$

where Om is the vector whose components are the rotations about the x, y, and z axes. The vector Om is calculated from M, A, dM, and dA.

Explicitly the six component equations defining the interrelationship between the vectors Om, M, and A are:

$$dAx = Oz*Ay - Oy*Az \qquad \text{Eq. (3.1)}$$

$$dAy = -Oz*Ax + Ox*Az \qquad \text{Eq. (3.2)}$$

$$dAz = Oy*Ax - Ox*Ay \qquad \text{Eq. (3.3)}$$

$$dMx = Oz*My - Oy*Mz \qquad \text{Eq. (3.4)}$$

$$dMy = -Oz*Mx + Ox*Mz \qquad \text{Eq. (3.5)}$$

$$dMz = Oy*Mx - Ox*My \qquad \text{Eq. (3.6)}$$

Explicit expressions may be obtained for the three unknowns Ox, Oy and Oz in terms of the known M, A, dM, and dA.

The flexibility provided by the extra equations maximizes numerical stability. For example, equation (3.1) could be written as:

$$Oy = -(dAx - OzAy)/Az \qquad \text{Eq. (4)}$$

Deriving equation (4) involves division by the z component of the A vector. Since A would come from the gravitational vector, we expect that in the usual case, the vertical component, Az, would be largest in magnitude. However, it is possible that for some orientations the Az component may have a relatively small magnitude. Error in the denominator would be magnified in the quotient.

Alternatively, Oz in equation (3.1) may have been isolated. However, dAx would be divided by Ay, which would result in a large error in the event Ay is relatively small too. If both Az and Ay are small, then equation (3.2) can be used to obtain a numerically stable Oz, because the denominator Ax will then be large.

Equation (4) is substituted into equation (3.4) to obtain an equation for Oz, an estimate of the rotation about the z-axis, as shown in equation (5):

$$Oz = (dMx*Az - dAx*Mx)/(My*Az - Mz*Ay) \qquad \text{Eq. (5)}$$

Instead of using equations (3.1) and (3.4), equations (3.2) and (3.5) may be used to obtain an alternate expression for Oz, as shown in equation (6):

$$Oz = (dMy*Az - dAy*Mz)/(Ax*Mz - Mx*Az) \qquad \text{Eq. (6)}$$

The decision of which equation to use, equation (5) or equation (6), is based on numeric stability. That is, it is undesirable for the denominator of equation (5) or equation (6) to be close to zero. The denominator of the x and y elements is the cross product of M and A. The cross product may be expanded such that the largest magnitude is selected. Once Oz has been calculated from either equation (5) or equation (6), the result is back substituted into equations (3.2) and (3.1) to obtain Ox and Oy.

If the initial assumption that Az is the largest component is wrong, then another divisor may be selected. For example, it may be determined that Ay is the largest component. Accordingly, equations (3.1) and (3.4) are used to obtain one expression for Oy. Equations (3.3) and (3.6) may be used to obtain an alternate value for Oy, as shown in equations (7) and (8):

$$Oy = (dMx*Ay - dAx*My)/(Az*My - Mz*Ay) \qquad \text{Eq. (8)}$$

$$Oy = (dMz*Ay - dAz*My)/(Mx*Ay - Ax*My) \qquad \text{Eq. (9)}$$

Alternatively, if Ax was the largest, yet another set of equations could be selected. Therefore, a numerically stable estimate of Om may be determined for the three rotational components Ox, Oy, and Oz.

Given an ensemble of independent measurements described above, the terms A (gain) and B (bias) can be solved via a linear regression in accordance with the matrix equation (10).

$$O_m = A*(O_g - B) \qquad \text{Eq. (10)}$$

Om is the measured rotation calculated from the accelerometers and/or magnetometers. Og is the observed rotation for the gyroscope as determined by information from the gyroscope sensors. A is the gyroscope gain and B is the gyroscope bias. The goodness of the fit can be estimated from the correlation. Thus, an estimate may be made in the field of both the gain and offset without the requirement that the sensor platform 102 be stationary with respect to rotations.

The gain in equation (10) could be a simple scale factor, with one scale factor for each of three components. The gain could also be a matrix, in which case the gain may include off diagonal elements that allow for mixing of the components.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method that compensates gyroscopes, the method comprising:
   rotating a sensor platform with three gyroscopes, three accelerometers and three magnetometers thereon;
   determining a first rotation vector Og based upon the rotation sensed by at least one of the three gyroscopes;
   determining a second rotation vector Om based upon the rotation sensed by the three accelerometers and the three magnetometers; and
   determining a compensation gain and a compensation bias for the at least one gyroscope based upon the first rotation vector and the second rotation vector;
   wherein determining the second rotation vector comprises:
   calculating a first rotation based upon the rotation sensed by changes in the accelerometers (dA); and
   calculating a second rotation based upon the rotation sensed by changes in the magnetometers (dM);
   wherein an acceleration vector A associated with the accelerometers corresponds to the changes sensed by the accelerometers (dA); and
   wherein a magnetic vector M associated with the magnetometers corresponds to the changes sensed by the magnetometers (dM);
   wherein calculating the first rotation is based upon solving for changes in the acceleration vector A defined by:

$$dAx = Oz*Av - Oy*Az,$$

$$dAy = -Oz*Ax + Ox*Az,$$

$$dAz = Qy*Ax - Ox*Ay, \text{ and}$$

wherein determining the second rotation is based upon solving for changes in the magnetic vector M defined by:

$$dMx=Oz*My-Oy*Mz,$$

$$dMy=-Oz*Mx+Ox*Mz, \text{and}$$

$$dMz=Oy*Mx-Ox*My;$$

where dMx, dMy, and dMz are the x, y, and z components, respectively, of the derivative of the magnetic vector M; Mx, My, and Mz are the x, y, and z components, respectively, of the magnetic vector M; dAx, dAy, and dAz are the x, y, and z components, respectively, of the derivative of the acceleration vector A; Ax, Ay, and Az are the x, y, and z components, respectively, of the acceleration vector A; and Ox, Oy, and Oz are the x, y, and z components, respectively, of the second rotation vector Om.

2. The method of claim 1, wherein rotating the sensor platform comprises:
rotating the sensor platform about an out of plane axis.

3. The method of claim 1,
wherein the vector A and the vector M are selected to point in different directions by setting a maximum threshold on the dot product of unit vectors corresponding to the vector A and the vector M.

4. The method of claim 1, wherein determining at least one of the compensation gain and the compensation bias for the gyroscope based upon the first rotation vector and the second rotation vector comprises:
selecting one of the first rotation and the second rotation; and
determining the observed rotation vector based upon a corresponding one of a first independent vector A and a second independent vector M.

5. The method of claim 4, wherein selecting one of the first independent vector A and the second independent vector M comprises:
determining a cross product of the first independent vector A with the second independent vector M;
determining which component of the cross product has the largest magnitude; and
selecting the equation combination according to which has the largest component in the denominator.

6. The method of claim 1, further comprising:
measuring the rotation with the gyroscope; and
measuring the rotation with at least one of the accelerometers and the magnetometers.

7. The method of claim 1, further comprising:
measuring the rotation with the three accelerometers orthogonally mounted on the sensor platform.

8. The method of claim 1, further comprising:
measuring the rotation with the three magnetometers orthogonally mounted on the sensor platform.

9. The method of claim 1, wherein determining at least one of the compensation gain and the compensation bias comprises:
determining at least one of a compensation gain and a compensation bias for three gyroscopes orthogonally mounted on the sensor platform based upon the first rotation vector and the second rotation vector.

10. The method of claim 1, wherein determining the second rotation vector comprises:
determining a gravity vector.

11. A gyroscope calibration system, comprising:
three gyroscopes mounted on a sensor platform and configured to sense a rotation of the sensor platform;
three accelerometers and three magnetometers mounted on the sensor platform and configured to sense the rotation of the sensor platform; and
a processor system operable to receive information corresponding to the sensed rotation from the three gyroscopes and the at least one of the three accelerometers and the three magnetometers, and configured to:
determine a first rotation vector based upon the rotation sensed by the gyroscopes;
determine a second rotation vector based upon the rotation sensed by at least one of the three accelerometers and the three magnetometers; and
determine at least one of a compensation gain and a compensation bias for the at least one gyroscope based upon the first rotation vector and the second rotation vector;
wherein the processor is configured to determine the second rotation vector by:
calculating a first rotation based upon the rotation sensed by changes in the accelerometers (dA); and
calculating a second rotation based upon the rotation sensed by changes in the magnetometers (dM);
wherein an acceleration vector A associated with the accelerometers corresponds to the changes sensed by the accelerometers (dA); and
wherein a magnetic vector M associated with the magnetometers corresponds to the changes sensed by the magnetometers (dM);
wherein the processor system calculates the first rotation based upon solving for changes in the acceleration vector A defined by:

$$dAx=Oz*Av-Oy*Az,$$

$$dAy=-Oz*Ax+Ox*Az,$$

$$dAz=Qy*Ax-Ox*Ay; \text{and}$$

wherein determining the second rotation is based upon solving for changes in the magnetic vector M defined by:

$$dMx=Oz*My-Oy*Mz,$$

$$dMy=-Oz*Mx+Ox*Mz, \text{and}$$

$$dMz=Oy*Mx-Ox*My;$$

where dMx, dMy, and dMz are the x, y, and z components, respectively, of the derivative of the magnetic vector M; Mx, My, and Mz are the x, y, and z components, respectively, of the magnetic vector M; dAx, dAy, and dAz are the x, y, and z components, respectively, of the derivative of the acceleration vector A; Ax, Ay, and Az are the x, y, and z components, respectively, of the acceleration vector A; and Ox, Oy, and Oz are the x, y, and z components, respectively, of the second rotation vector.

12. The system of claim 11, wherein the three gyroscopes are orthogonally mounted on the sensor platform.

13. The method of claim 1,
wherein the vector A and the vector M are selected to point in different directions by setting a maximum threshold on the dot product of unit vectors corresponding to the vector A and the vector M.

14. A system that compensates gyroscopes mounted on a sensor platform, comprising:
means for sensing a rotation of the sensor platform; and
means for determining a first rotation vector based upon the rotation of the sensor platform sensed by three gyroscopes, determining a second rotation vector based upon the rotation sensed by the means for sensing, and determining at least one of a compensation gain and a compensation bias for the gyroscopes based upon the determined first rotation vector and the determined second rotation vectors;
wherein the means for sensing comprises at least one of three accelerometers and three magnetometers;
wherein determining the second rotation vector comprises:
calculating a first rotation based upon the rotation sensed by changes in the accelerometers (dA); and
calculating a second rotation based upon the rotation sensed by changes in the magnetometers (dM);
wherein an acceleration vector A associated with the accelerometers corresponds to the changes sensed by the accelerometers (dA); and
wherein a magnetic vector M associated with the magnetometers corresponds to the changes sensed by the magnetometers (dM);
wherein calculating the first rotation is based upon solving for changes in the acceleration vector A defined by:

$dAx=Oz*Ay-Oy*Az,$ $dAy=-Oz*Ax+Ox*Az,$ $dAz=Oy*Ax-Ox*Ay,$ and wherein determining the second rotation is based upon solving for changes in the magnetic vector M defined by:

$dMx=Oz*My-Oy*Mz,$ $dMy=-Oz*Mx+Ox*Mz,$ and $dMz=Oy*Mx-Ox*My;$ where dMx, dMy, and dMz are the x, y, and z components, respectively, of the derivative of the magnetic vector M; Mx, My, and Mz are the x, y, and z components, respectively, of the magnetic vector M; dAx, dAy, and dAz are the x, y, and z components, respectively, of the derivative of the acceleration vector A; Ax, Ay, and Az are the x, y, and z components, respectively, of the acceleration vector A; and Ox, Oy, and Oz are the x, y, and z components, respectively, of the second rotation vector.

15. The system of claim 14, wherein the three gyroscopes are mounted on the sensor platform.

16. The system of claim 15, wherein the three gyroscopes are orthogonally mounted on the sensor platform.

* * * * *

UNITED STATES PATENT AND TRADEMARK OFFICE
CERTIFICATE OF CORRECTION

PATENT NO. : 8,548,766 B2  Page 1 of 1
APPLICATION NO. : 12/558871
DATED : October 1, 2013
INVENTOR(S) : Judd It is certified that error appears in the above-identified patent and that said Letters Patent is hereby corrected as shown below:

In the Claims

At Claim 1, Column 6, Line 62, replace "$dAx=Oz*Av-Oy*Az$" with --$dAx=Oz*Ay-Oy*Az$--.

At Claim 1, Column 6, Line 67, replace "$dAz=Qy*Ax-Ox*Ay$, and" with --$dAz=Oy*Ax-Ox*Ay$, and--.

At Claim 11, Column 8, Line 31, replace "$dAx=Oz*Av-Oy*Az$" with --$dAx=Oz*Ay-Oy*Az$--.

At Claim 11, Column 8, Line 35, replace "$dAz=Qy*Ax-Ox*Ay$, and" with --$dAz=Oy*Ax-Ox*Ay$, and--.

At Claim 13, Column 8, Line 55, replace "The method of claim 1," with --The system of claim 11,--.

At Claim 14, Column 9, Line 19, replace "$dAx=Oz*Av-Oy*Az$" with --$dAx=Oz*Ay-Oy*Az$--.

At Claim 14, Column 9, Line 23, replace "$dAz=Qy*Ax-Ox*Ay$, and" with --$dAz=Oy*Ax-Ox*Ay$, and--.

Signed and Sealed this
Twenty-ninth Day of July, 2014

Michelle K. Lee
*Deputy Director of the United States Patent and Trademark Office*